(12) United States Patent
Freidanck

(10) Patent No.: US 9,090,749 B2
(45) Date of Patent: Jul. 28, 2015

(54) METHOD FOR PRODUCING AQUEOUS POLYMER DISPERSIONS

(71) Applicant: Wacker Chemie AG, Munich (DE)

(72) Inventor: Frank Freidanck, Burghausen (DE)

(73) Assignee: Wacker Chemie AG, Munich (DE)

(*) Notice: Subject to any disclaimer, the term of this patent is extended or adjusted under 35 U.S.C. 154(b) by 0 days.

(21) Appl. No.: 14/365,649

(22) PCT Filed: Dec. 19, 2012

(86) PCT No.: PCT/EP2012/076245
§ 371 (c)(1),
(2) Date: Jun. 16, 2014

(87) PCT Pub. No.: WO2013/092771
PCT Pub. Date: Jun. 27, 2013

(65) Prior Publication Data
US 2014/0357778 A1    Dec. 4, 2014

(30) Foreign Application Priority Data

Dec. 20, 2011 (DE) .......... 10 2011 089 271

(51) Int. Cl.
*C08J 3/20* (2006.01)
*C08F 6/00* (2006.01)

(52) U.S. Cl.
CPC . *C08J 3/20* (2013.01); *C08F 6/003* (2013.01); *C08J 2331/04* (2013.01); *C08J 2429/04* (2013.01)

(58) Field of Classification Search
CPC ...... C08J 3/20; C08J 2331/04; C08J 2429/04; C08F 6/003
USPC .......... 524/503; 516/77; 165/104.11
See application file for complete search history.

(56) References Cited

U.S. PATENT DOCUMENTS

| 5,856,381 A | 1/1999 | Rehmer et al. |
| 6,355,712 B1 * | 3/2002 | Schultes et al. ............... 524/296 |
| 2004/0050419 A1 | 3/2004 | Wassmer et al. |
| 2010/0298492 A1 | 11/2010 | Manders et al. |

FOREIGN PATENT DOCUMENTS

| DE | 19617183 A1 * | 10/1997 |
| DE | 10107044 A1 * | 8/2002 |
| EP | 1041093 A2 | 10/2000 |
| WO | 2008000649 A1 | 1/2008 |

* cited by examiner

*Primary Examiner* — Kelechi Egwim
(74) *Attorney, Agent, or Firm* — Brooks Kushman P.C.

(57) ABSTRACT

Process time for finishing aqueous polymer dispersions is significantly reduced by cooling the aqueous polymer dispersion from the polymerization by a heat exchanger prior to entry into a storage vessel. The dispersion may enter a letdown vessel prior to being cooled. Finishing additives are metered into the dispersion following cooling but prior to entry into the storage vessel.

10 Claims, 1 Drawing Sheet

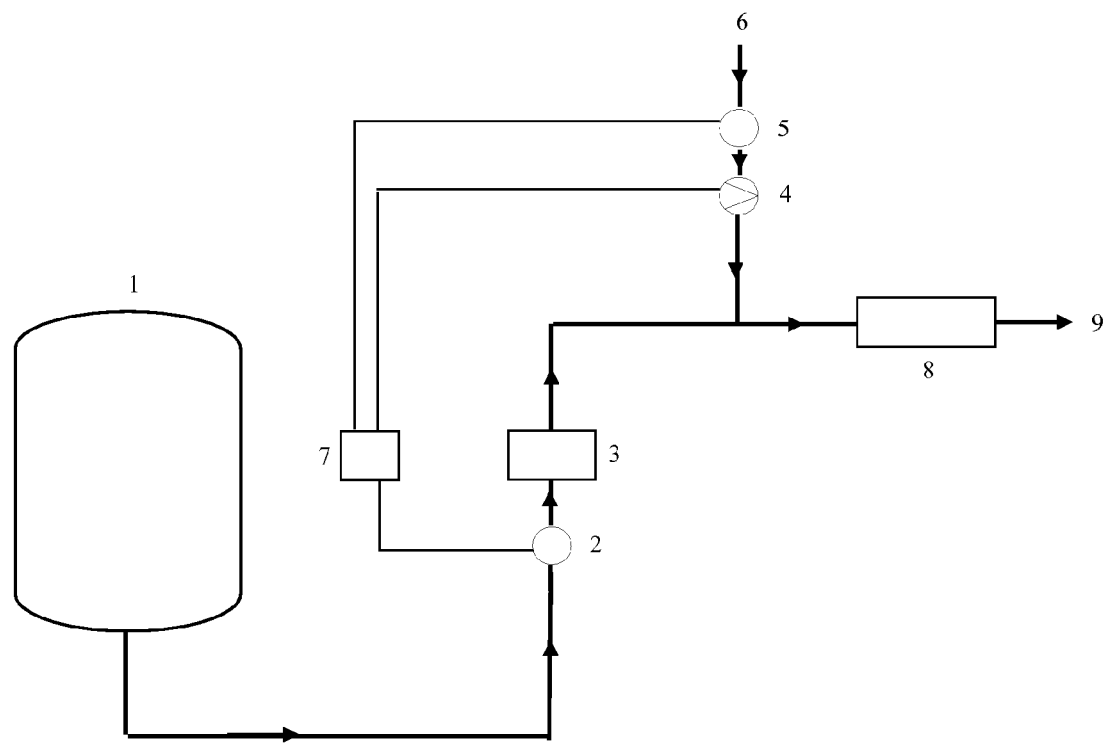

METHOD FOR PRODUCING AQUEOUS POLYMER DISPERSIONS

CROSS-REFERENCE TO RELATED APPLICATIONS

This application is the U.S. National Phase of PCT Appln. No. PCT/EP2012/076245 filed Dec. 19, 2012, which claims priority to German Application No. 10 2011 089 271.0 filed Dec. 20, 2012, the disclosures of which are incorporated in their entirety by reference herein.

FIELD OF THE INVENTION

The invention relates to methods for finishing aqueous dispersions of polymers based on ethylenically unsaturated monomers.

DESCRIPTION OF THE RELATED ART

Aqueous polymer dispersions, as for example aqueous dispersions of vinyl acetate-ethylene copolymers, are prepared in general by means of radically initiated suspension polymerization or by means of radically initiated emulsion polymerization. Such polymer dispersions have a broad application spectrum and are used, for example, as binders for coating materials such as paints, as binders in adhesives, or as coating materials and/or binders for textiles or paper. Further applications are their use as binders in chemical construction products, frequently in conjunction with mineral binders, and as binders in construction adhesives such as tile adhesives or thermal insulation composite adhesives, in renders, filling compounds, leveling compounds, grouts, and jointing mortars, or as additives to concrete.

Depending on the field of application, the need exists for such polymer dispersions to be appropriately finished—that is, admixed with appropriate additives. Examples are the addition of biocides or preservatives to optimize storage stability of the polymer dispersions, the addition of defoamers to optimize processability, the establishment of an optimum pH by addition of acids or bases, or the addition of hydrophobizing agents.

The additives for treating (finishing) the aqueous polymer dispersions are added after the conclusion of the polymerization. Since the radically initiated polymerization of ethylenically unsaturated monomers is carried out in general at a temperature level far above room temperature, usually at 60° C. to 90° C., but in many cases the additives used for finishing are temperature-sensitive, the need exists to cool the polymer dispersion, after the conclusion of the polymerization, to temperatures of about 25° C. to 45° C., and only then to add the additives. The need exists to cool the completed polymer dispersion, in addition, since if the temperature is too high there may be considerable skinning on the surface of the aqueous polymer dispersions in the storage vessel.

The procedure adopted to date, therefore, after conclusion of polymerization, has been to transfer the polymer dispersion from the polymerization reactor into a vessel, generally with somewhat larger dimensions, and equipped with cooling devices, for example, a double wall or heat exchangers. Such vessels are frequently referred to as finishing vessels. As finishing vessels it is also possible to use letdown vessels. Letdown vessels are generally used if the polymerization is carried out in the polymerization reactor under pressure, which is usually the case for the polymerization of gaseous monomers such as ethylene or propylene. Subsequent to the polymerization, the polymer dispersions are then transferred into letdown vessels, in order to let down the polymer dispersions for the purpose of removing gaseous residual monomers, and to cool them in parallel with this let down. Further residual monomer fractions may be removed by means of stripping. In addition to these physical measures for removal of residual monomers, a post polymerization is frequently also carried out. A procedure of this kind is disclosed in WO 2008/000649 A1, for example. Cooling of the polymer dispersion in this vessel is then followed by finishing with the appropriate additives.

A disadvantage of this procedure is the long period of time needed for the cooling of the polymer dispersion in the finishing vessel or letdown vessel. Furthermore, prior to the final finishing of the polymer dispersion with the stated additives, there are frequently holding times that must be observed, so that, for example, sensitive additives are not degraded by the agents used in the post polymerization and/or by excessively high temperatures. As a result, in numerous polymerization methods, with an average polymerization time of five hours, the post polymerization and final finishing become the determining step for the cycle time, since they take up four to ten hours with the existing methods.

SUMMARY OF THE INVENTION

An object of the invention was therefore to provide methods for finishing aqueous polymer dispersions that allow the disadvantages identified above to be avoided. The invention provides methods for finishing aqueous dispersions of polymers based on ethylenically unsaturated monomers, by polymerizing ethylenically unsaturated monomers by means of radically initialized polymerization in an aqueous medium in a polymerization reactor, and transferring the resultant aqueous polymer dispersion into one or more letdown vessels and subsequently into one or more storage vessels, characterized in that the aqueous polymer dispersion between the letdown vessel and the storage vessel
a) is first cooled to a temperature of 45° C. and
b) subsequently one or more additives are added.

This method is also referred to below as the method with letdown vessel. The present invention further provides a method for finishing aqueous dispersions of polymers based on ethylenically unsaturated monomers, by polymerizing ethylenically unsaturated monomers by means of radically initialized polymerization in an aqueous medium in a polymerization reactor, and transferring the resultant aqueous polymer dispersion from the polymerization reactor into one or more storage vessels, characterized in that the aqueous polymer dispersion between the polymerization reactor and the storage vessel
a) is first cooled to a temperature of 45° C. and
b) subsequently one or more additives are added,
the aqueous polymer dispersion not being transferred into any letdown vessel or into any finishing vessel before it is transferred into a storage vessel. This method is also referred to below as the method without letdown vessel.

BRIEF DESCRIPTION OF THE DRAWINGS

FIG. 1 illustrates one embodiment of the present invention.

DETAILED DESCRIPTION OF THE PREFERRED EMBODIMENTS

Unless otherwise indicated, the details below relate both to the method with a letdown vessel and to the method without letdown vessel.

A substantial advantage of the methods of the invention is that there is no need, following the radical polymerization, for the polymer dispersions to be stored temporarily in any vessel in order to cool the polymer dispersions to the temperature desired for finishing.

Ethylenically unsaturated monomers suitable for preparing the aqueous polymer dispersions are those from the group encompassing vinyl esters of carboxylic acids having 1 to 15 C atoms, methacrylic esters or acrylic esters of carboxylic acids with unbranched or branched alcohols having 1 to 15 C atoms, olefins or dienes, vinylaromatics, or vinyl halides.

Preferred vinyl esters are vinyl acetate, vinyl propionate, vinyl butyrate, vinyl-2-ethylhexanoate, vinyl laurate, 1-methylvinyl acetate, vinyl pivalate, and vinyl esters of alpha-branched monocarboxylic acids having 5 to 13 C atoms, as for example VeoVa9R or VeoVa10R (trade names of Momentive). Particularly preferred is vinyl acetate.

Preferred methacrylic esters or acrylic esters are esters of unbranched or branched alcohols having 1 to 15 C atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particularly preferred are methyl acrylate, methyl methacrylate, n-butyl acrylate, and 2-ethylhexyl acrylate.

Preferred olefins or dienes are ethylene, propylene, and 1,3-butadiene. Preferred vinylaromatics are styrene and vinyltoluene. A preferred vinyl halide is vinyl chloride.

Optionally there may also be 0.05 to 50 wt %, preferably 1 to 10 wt %, based on the total weight of the base polymer, of auxiliary monomers copolymerized. Examples of auxiliary monomers are ethylenically unsaturated monocarboxylic and dicarboxylic acids, ethylenically unsaturated carboxamides, ethylenically unsaturated sulfonic acids and their salts, pre-crosslinking comonomers such as polyethylenically unsaturated comonomers, postcrosslinking comonomers such as N-methylolacrylamide, epoxide-functional comonomers, or silicon-functional comonomers.

Preference is given to aqueous polymer dispersions based on vinyl acetate homopolymers; copolymers of vinyl acetate with 1 to 40 wt % of ethylene; copolymers of vinyl acetate with 1 to 40 wt % of ethylene and 1 to 50 wt % of one or more other comonomers from the group of the vinyl esters having 1 to 12 C atoms in the carboxylic acid radical, such as vinyl propionate, vinyl laurate, vinyl esters of alpha-branched carboxylic acids having 5 to 13 C atoms such as VeoVa9R, VeoVa10R, VeoVa11R; copolymers of vinyl acetate, 1 to 40 wt % of ethylene, and preferably 1 to 60 wt % of (meth)acrylic esters of unbranched or branched alcohols having 1 to 15 C atoms, more particularly methyl methacrylate, n-butyl acrylate, or 2-ethylhexyl acrylate; copolymers with 30 to 75 wt % of vinyl acetate, 1 to 30 wt % of vinyl laurate or vinyl esters of an alpha-branched carboxylic acid having 5 to 13 C atoms, and 1 to 30 wt % of (meth)acrylic esters of unbranched or branched alcohols having 1 to 15 C atoms, more particularly methyl methacrylate, n-butyl acrylate or 2-ethylhexyl acrylate, which may further include 1 to 40 wt % of ethylene; copolymers with vinyl acetate, 1 to 40 wt % of ethylene, and 1 to 60 wt % of vinyl chloride; the polymers may in each case further include the stated auxiliary monomers in the stated amounts, and the figures in wt % add up to 100 wt % in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; styrene-acrylic ester copolymers with one or more monomers from the group of methyl acrylate, ethyl acrylate, propyl acrylate, n-butyl acrylate, 2-ethylhexyl acrylate; styrene-1,3-butadiene-copolymers; the polymers may further include the stated auxiliary monomers in the stated amounts, and the figures in wt % add up to 100 wt % in each case.

The base polymers are prepared by the suspension polymerization method or, preferably, by the emulsion polymerization method. The polymerization temperature is preferably between 50° C. and 100° C., more preferably between 60° C. and 90° C.

In the case of the copolymerization of gaseous comonomers such as ethylene, 1,3-butadiene or vinyl chloride, it is also possible to carry out polymerization under pressure, in general between 5 bar and 100 bar. For this case, the method of the invention with letdown vessel is generally employed.

In the absence of gaseous monomers, polymerization is carried out generally at ambient pressure or in the range from 0.8 to 5 bar. For this case, the method of the invention without letdown vessel is generally employed.

The polymerization is initiated using the water-soluble and/or monomer-soluble initiators, or redox initiator combinations, that are customary for emulsion polymerization or suspension polymerization, respectively. The polymerization takes place customarily in the presence of dispersing assistants, in which case both protective colloids and emulsifiers are contemplated.

Suitable protective colloids are partially hydrolyzed polyvinyl alcohols; polyvinylpyrrolidones; polysaccharides in water-soluble form such as starches, celluloses, and their carboxymethyl, methyl, hydroxyethyl, and hydroxypropyl derivatives; proteins such as casein or caseinate, soy protein, and gelatin; lignosulfonates; synthetic polymers such as poly(meth)acrylic acid, copolymers of (meth)acrylates with carboxyl-functional comonomer units, poly(meth)acrylamide, polyvinylsulfonic acids, and water-soluble copolymers thereof; melamine-formaldehyde sulfonates, naphthalene-formaldehyde sulfonates, styrene-maleic acid copolymers, and vinyl ether-maleic acid copolymers. Preference is given to partially hydrolyzed or fully hydrolyzed polyvinyl alcohols. Particularly preferred are partially hydrolyzed polyvinyl alcohols with a degree of hydrolysis of 80 to 95 mol % and with a Hoppler viscosity in 4% strength aqueous solution of 1 to 30 mPas (Höppler method at 20° C., DIN 53015). The protective colloids are added generally in an amount of in total 1 to 20 wt %, based on the total weight of the monomers, during the polymerization.

With the method of the invention, polymerization may also take place in the presence of emulsifiers, in which case the amounts of emulsifier are in general 1 to 10 wt %, based on the total weight of the monomers. Suitable emulsifiers are anionic, cationic, and nonanionic emulsifiers, examples being anionic surfactants, such as alkyl sulfates with a chain length of 8 to 18 C atoms, alkyl or alkylaryl ether sulfates having 8 to 18 C atoms in the hydrophobic radical and up to 40 ethylene oxide or propylene oxide units, alkyl- or alkylarylsulfonates having 8 to 18 C atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

The polymerization can be carried out in a batch process, a semibatch process, or a continuous process. The monomers here may be included in their entirety in the initial charge, metered in their entirety, or included in fractions in the initial charge, with the remainder metered in after the polymerization has been initiated. The meterings may be carried out separately (in space and in time), or some or all of the components to be metered may be metered in pre-emulsified form.

The polymerization is carried out generally to a conversion of ≥95 wt %, preferably to a conversion of 95 to 99 wt %, of the monomers liquid under polymerization conditions.

In the case of the method with letdown vessel, the polymerization mixture is transferred subsequently from the polymerization reactor into a letdown vessel. When preparing pressure dispersions, for which gaseous monomers are polymerized under pressure, examples being copolymers of vinyl acetate and ethylene, letdown is carried out in the letdown vessel to a pressure of 0.1 to 5.0 bar abs., preferably 0.1 to 1.0 bar abs., with gaseous residual monomer being drawn off under suction. In the case of discontinuous operation (batch or semibatch mode), the transfer takes place into one or more letdown vessels after polymerization is concluded. In the case of continuous polymerization, the polymerization mixture is transferred continuously into one or more letdown vessels.

In the method without letdown vessel, the polymer dispersions in the polymerization reactor, and also between the polymerization reactor and the storage vessel, are generally subject to the ambient pressure, i.e., to a pressure of preferably 0.8 to 1.2 bar abs.

Postpolymerization may be carried out in the letdown vessel or in the polymerization reactor, optionally, using known methods, as for example by postpolymerization initiated with redox initiator. The volatile fraction of residual monomer is removed optionally by passing inert entraining gases such as air, nitrogen or, preferably, steam over or through the aqueous polymer dispersion in a way with which the skilled person is familiar (stripping). The procedure is preferably such that there is no active cooling during postpolymerization and, optionally, during stripping.

The transferring of the polymer dispersions from the polymerization reactor into the letdown vessel and/or from the letdown vessel into the storage vessel, or the transferring of the polymer dispersions from the polymerization reactor into the storage vessel, can take place via lines common for this purpose, such as pipelines, more particularly steel pipes. Where necessary, the customary pumps can be employed here, such as eccentric screw pumps, rotary piston pumps or sinusoidal pumps, for example.

In the case of the method with a letdown vessel, the aqueous polymer dispersion is cooled in method step a) between the letdown vessel and the storage vessel, preferably using one or more heat exchangers. In the case of the method without a letdown vessel or without finishing vessels, the aqueous polymer dispersion is cooled in method step a) between the polymerization reactor and the storage vessel, preferably using one or more heat exchangers. Examples of suitable heat exchangers are plate heat exchangers or, preferably, shell-and-tube heat exchangers, or cooling coils built into the line. Where two or more heat exchangers are employed, they are preferably connected in series. An alternative possibility is also to connect one or more heat exchangers to the line via bypasses—that is, to connect them in parallel. Cooling may take place in concurrent or, preferably, in countercurrent fashion.

In method step a), the aqueous polymer dispersions are cooled to a temperature of ≤45° C., preferably 15° C. to 40° C., more preferably 25° C. to 40° C., and most preferably 30° C. to 40° C.

Because of the cooling, the temperature of the polymer dispersion immediately after method step a) has been implemented is lower than immediately before method step a) is implemented. As part of the implementation of method step a), the polymer dispersion is cooled preferably by 1° C. to 55° C., more preferably by 1° C. to 45° C., yet more preferably by 5° C. to 35° C., and most preferably by 5° C. to 15° C.

For finishing, generally one or more additives are metered in between the heat exchanger and storage vessel. The additives are metered in preferably via one or more metering pumps, such as piston diaphragm pumps, into the line between heat exchanger and reservoir vessel. The additives are preferably metered in liquid form. Additives in solid form are preferably metered in solution or as an aqueous dispersion. The additives may be located in reservoir vessels before they are metered in. These additives may be metered from separate reservoir vessels via a metering pump in each case. Also possible is a procedure wherein a plurality of additives are metered as a mixture from a reservoir vessel, or certain additives are metered individually and others as a mixture.

To ensure synchronicity between the metering amount of the additives and the flow rate of the polymer dispersion, in other words for the exact metering of the additives, the metering pumps are furnished preferably with one or more control devices. The control devices comprise, for example, one or preferably two or more flow meters, and a rate regulator unit. One flow meter is preferably installed between the letdown vessel and a heat exchanger or, in the case of the method without letdown vessel, between the polymerization reactor and a heat exchanger. One flow meter is preferably also installed in the line between the heat exchanger and the storage vessel. The flow meters are preferably linked to a rate regulator unit, which in turn controls the throughput of the additive metering pump and/or of the polymer dispersion pump. These measures make a contribution to ensuring a constant mixing ratio between polymer dispersion and additive. In practice it has also proven appropriate to pass a first or last portion of the aqueous polymer dispersion pumped off from the letdown vessel or from the polymerization reactor back into the letdown vessel or, in the case of the method without letdown vessel, into the polymerization reactor, after it has passed through the heat exchangers and has passed the metering pump or pumps, and to pump it off again. In this way it is possible to even out inhomogeneities in the metering of additives during start-up and shut-down.

In one preferred embodiment, the line to the storage vessel is equipped with a mixing unit downstream of the locations at which one or more additives are metered in. After each location at which metering takes place, or preferably only after the last location at which metering takes place, a mixing unit may be installed in the line. The mixing unit assists homogeneous and uniform mixing of the additives and of the aqueous polymer dispersion. Preference is given to static mixing units, an example being a mixing pipe with installed baffle plates or diverter plates or static mixers with structured packings.

Also preferred is an embodiment in which the mixing unit can be circumvented by a bypass. This embodiment is useful when there is no necessity for metering at the metering device preceding the mixing unit. In this way, a single plant can be used to produce polymer dispersions finished with different additives, without the need for the plant to be cleaned in-between.

With the method of the invention, all of the additives customary for finishing can be metered into the aqueous polymer dispersions, in the required amounts. Examples of such additives are biocides, preservatives, defoamers, acids or bases, or hydrophobizing agents.

With the method of the invention, cooling can be carried out substantially more rapidly than with exclusive cooling in the polymerization reactor, letdown vessel, or finishing vessels. The finishing vessels used in conventional methods generally have at least the same volume as the polymerization reactor, and are equipped with cooling devices, a double wall or heat exchangers, for example, in order to cool the polymer dispersion to the desired temperature and subsequently to admix it with the additive. The procedure according to the invention does away with the need to use finishing vessels; additionally, any holding times for the dispersions in polymerization reactors or letdown vessels before addition of sensitive additives can be dispensed with. As a consequence, therefore, the duration for one polymerization and finishing cycle can be reduced by up to three hours. Depending on batch size, this means a reduction in cycle times by 30% to 50%, bringing massive economic advantages.

The example which follows is used for detailed elucidation of the invention, and should not be considered as limiting the invention in any way.

Example

An aqueous, polyvinyl alcohol-stabilized dispersion of a vinyl acetate-ethylene copolymer (solids content 60.1%) with a temperature of 65° C. was withdrawn continuously from the letdown vessel (1) in accordance with FIG. 1, and was cooled to 45° C. in a plate heat exchanger (3). As an additive, a 1% strength aqueous solution of a preservative was introduced via the line (6) between the heat exchanger (3) and the static mixer (8), in other words upstream of the storage vessel (9), into the polymer dispersion stream. The amounts of polymer dispersion and preservative solutions applied were measured by the flow meters (2) and (5), and controlled by means of the rate regulator (7) with the pump (4) in such a way as to give a constant mixing ratio of polymer dispersion to preservative solution of 667:1. Downstream of the static mixer (8), in which deflector plates were installed, the preservative was distributed uniformly in the polymer dispersion, at a concentration of 15 ppm. Lastly, the finished polymer dispersion (9) was supplied to a storage vessel.

The method of the invention without letdown vessel is conducted analogously with the above-described method with a letdown vessel, with the polymerization reactor (1) installed in place of the letdown vessel (1), and, for example, using a dispersion of a vinyl acetate homopolymer in place of the dispersion of the vinyl acetate-ethylene copolymer.

The invention claimed is:

1. A method for finishing an aqueous polymer dispersion prepared by polymerizing ethylenically unsaturated monomers by means of radically initiated polymerization in an aqueous medium in a polymerization reactor, comprising transferring a resultant aqueous polymer dispersion from the polymerization reactor into at least one storage vessel, wherein the aqueous polymer dispersion from the polymerization reactor, prior to entry into the storage vessel,
   a) is first cooled using one or more heat exchangers to a temperature of ≤45° C., and
   b) subsequently one or more additives are metered into the aqueous polymer dispersion between the heat exchanger and storage vessel,
   the aqueous polymer dispersion not being transferred into any finishing vessel before it is transferred into a storage vessel.

2. The method of claim 1, wherein the aqueous polymer dispersion is transferred from the polymerization reactor to a letdown vessel prior to cooling with the one or more heat exchangers.

3. The method for finishing an aqueous polymer dispersion of claim 1, wherein one or more ethylenically unsaturated monomers are selected from the group consisting of vinyl esters of carboxylic acids having 1 to 15 C atoms, (meth)acrylic esters of carboxylic acids with optionally branched alcohols having 1 to 15 C atoms, olefins, dienes, vinylaromatics, and vinyl halides.

4. The method for finishing an aqueous polymer dispersion of claim 1, wherein the aqueous polymer dispersion is cooled in step a) to a temperature of 15° C. to 40° C.

5. The method for finishing an aqueous polymer dispersion of claim 1, whereas the aqueous polymer dispersion, as a result of step a), is cooled from 1° C. to 55° C.

6. The method for finishing an aqueous polymer dispersion of claim 1, wherein when two or more additives are metered in, a) the additives are each metered in from separate reservoir vessels via a metering pump, b) the additives are metered as a mixture from a reservoir vessel, or c) some additives are metered individually and others are metered as a mixture.

7. The method for finishing an aqueous polymer dispersion of claim 6, wherein the polymer dispersion is passed in a line from the heat exchanger to the storage vessel, and the line, downstream of locations at which one or more additives are metered in, is equipped with one or more mixing units.

8. The method for finishing an aqueous dispersion of claim 7, wherein at least one mixing unit is a static mixing unit.

9. The method for finishing an aqueous polymer dispersion of claim 7, wherein one or more mixing units may be circumvented with a bypass.

10. The method for finishing an aqueous dispersion of claim 1, wherein one or more biocides, preservatives, acids or bases, defoamers, or hydrophobizing agents are metered in.

* * * * *